United States Patent [19]
Medley

[11] Patent Number: 5,980,383
[45] Date of Patent: Nov. 9, 1999

[54] ATTACHMENT FOR AN AUGER OF A HARVESTING MACHINE

[76] Inventor: William A. Medley, 17376 S. 680 West, Remington, Ind. 47977

[21] Appl. No.: 08/954,847

[22] Filed: Oct. 21, 1997

[51] Int. Cl.$^6$ ................................................. A01D 17/02
[52] U.S. Cl. ............................ 460/114; 460/20; 460/70; 56/153
[58] Field of Search ................................ 460/114, 16, 20, 460/25, 70, 901; 56/16.4 R, 16.6, 94, 119, 153

[56] References Cited

U.S. PATENT DOCUMENTS

| | | | |
|---|---|---|---|
| 2,312,838 | 3/1943 | Johnston | 460/70 |
| 2,849,103 | 8/1958 | Scheffler et al. | 56/153 |
| 3,126,691 | 3/1964 | Krahn et al. | 56/119 |
| 3,156,079 | 11/1964 | Park et al. | 56/2 |
| 3,282,408 | 11/1966 | Lohrentz | 198/211 |
| 3,350,865 | 11/1967 | Ashton et al. | 56/119 |
| 4,528,992 | 7/1985 | Heidjann | 56/14.6 X |
| 4,663,921 | 5/1987 | Hagstrom et al. | 56/14.6 |
| 5,090,187 | 2/1992 | Mews | 56/364 |
| 5,161,355 | 11/1992 | Diederich, Jr. | 56/51 |

*Primary Examiner*—Thomas B. Will
*Assistant Examiner*—Arpad Fabian Kovacs
*Attorney, Agent, or Firm*—Van Dyke, Gardner, Linn & Burkhart, LLP

[57] ABSTRACT

An attachment for an auger of a harvesting machine reduces or essentially eliminates residue build-up on the auger of the harvesting machine. The attachment includes a paddle, which is adapted to be secured to the auger between the flighting of the auger, and at least one projecting member which extends from the paddle and projects above the flighting of the auger for breaking up crop residue which tends to build up above the auger. The projecting member is secured to the paddle by at least one fastener, for example a bolt, a screw, or a rivet. Preferably, the projecting member comprises metal, plastic, or polymeric material, such as ultra high molecular weight polyethylene or a high density polyethylene. In one form, the paddle and the projecting member are integrally formed to provide a unitary construction.

24 Claims, 3 Drawing Sheets

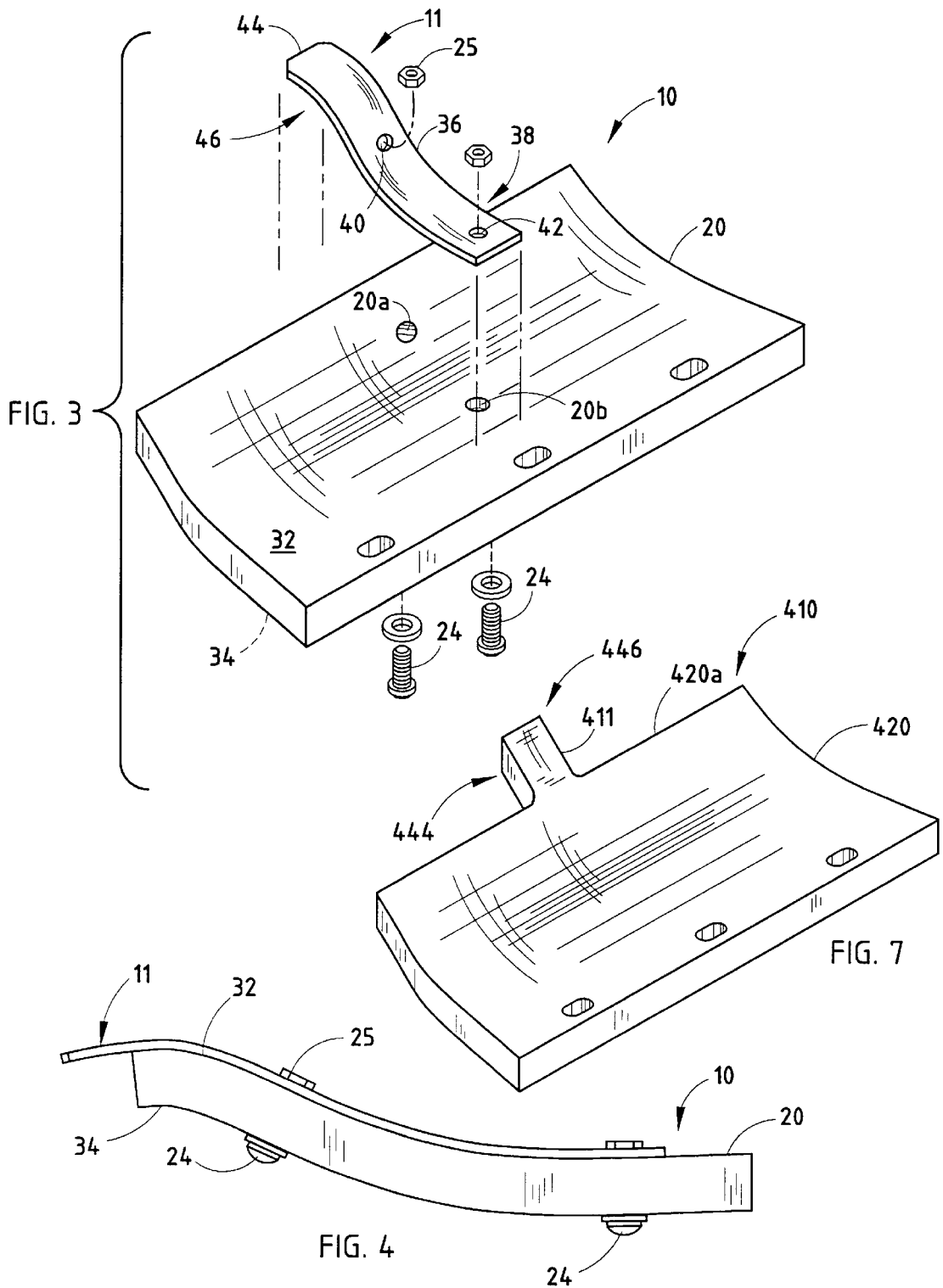

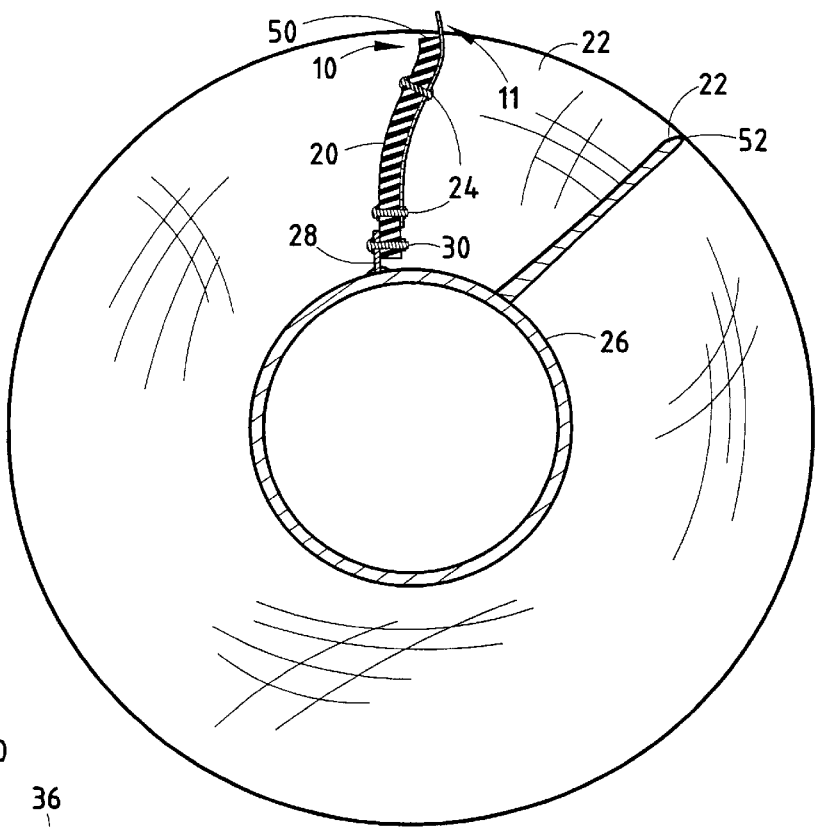
FIG. 5
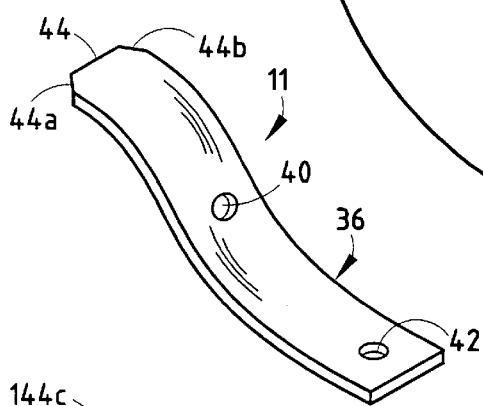
FIG. 6A
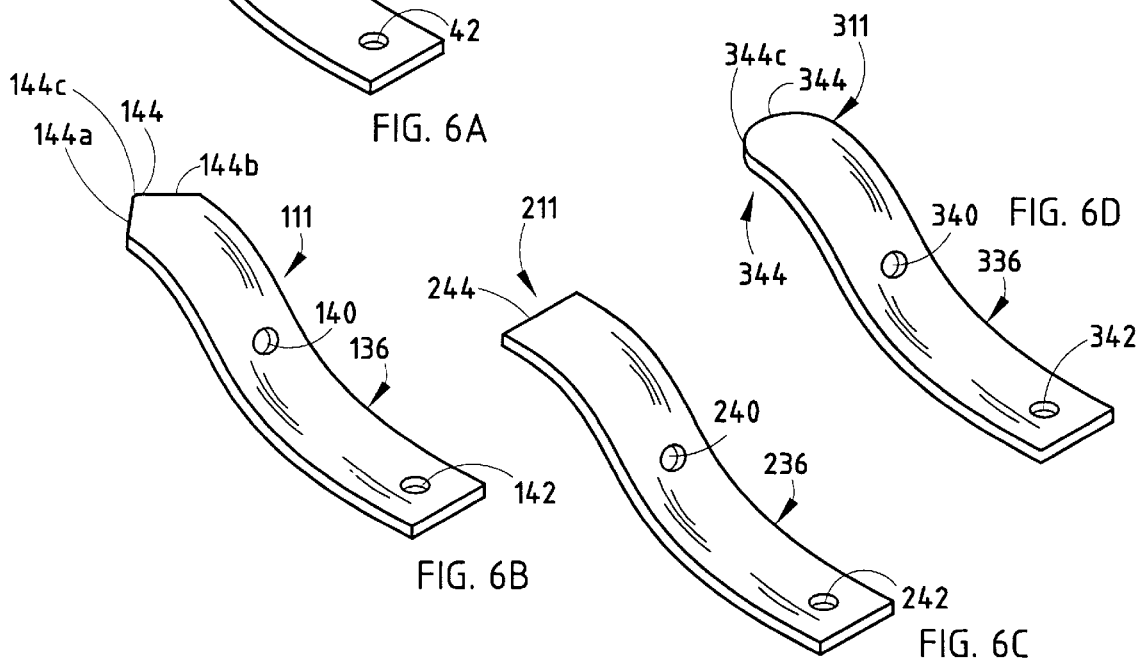
FIG. 6B
FIG. 6C
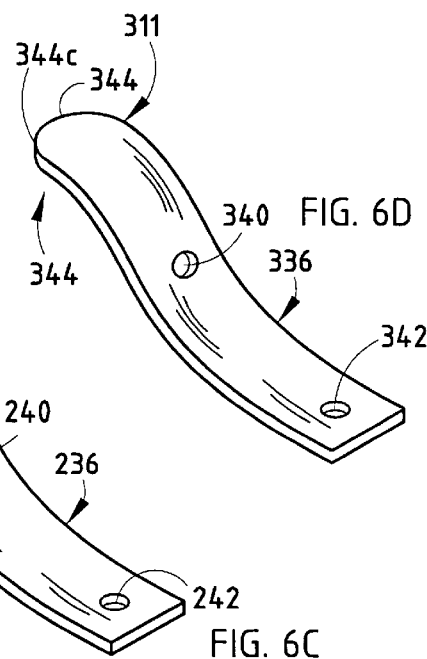
FIG. 6D

ATTACHMENT FOR AN AUGER OF A HARVESTING MACHINE

TECHNICAL FIELD AND BACKGROUND OF THE INVENTION

The present invention relates to a combine or harvesting machine and, more particularly, to an attachement which is mounted to the auger of the harvesting machine to reduce residue build-up on the auger which inhibits the flow of crop through the harvesting machine.

Conventional corn harvesting machines include a corn-head attachment. The corn-head attachment comprises a plurality of spaced apart row crop dividers. The dividers are arranged in a side-by-side relationship and define crop flow paths through which the crops are conveyed. During harvesting, the crop moves up the dividers along the flow path and the dividers, which are equipped with cutting edges, sever the crop near or at the ground surface. Positioned at the end of each of the flow paths is a converging or corn-head auger, which, together with a series of chains, moves the severed crop towards the central portion of the auger to feed the crops to a feeder housing for further procesing. The crop is fed to the feeder housing from the auger through an opening which tends to create a flow constriction. Under certain conditions, residue, i.e. cornstalks and weeds, collect on the top of the corn-head auger as a result of the contrictive flow path. When excessive build-up occurs, the operator must pause or stop the machine so that the operator can manually remove the residue from the auger. This is extremely time consuming and inefficient.

To resolve this problem, some combines have corn paddles mounted onto the main auger of the corn-head. The corn paddles are mounted to the cylindrical body of the auger and provide a pushing surface to urge the residue through the opening of the feeder housing. The paddles are generally made of rubber and, therefore, are flexible and inflict minimal damage on the crop. Typically, the height of the corn paddles are the same height of the main auger flighting. The flighting on the auger is a thin sheet of metal attached in a spiral fashion to the auger tube. The auger and the corn paddles, however, do not always eliminate the excess residue build-up. Although these paddles have alleviated some of the residue build-up, operators with some frequency are still required to stop the machine and remove residue build-up from the auger. Therefore, there is a need to modify the corn-head auger to eliminate the excessive build-up of residue which blocks the flow of the corn ears to the main feeder house of the combine. Preferably, the auger can be modified with an attachment which can break-up the residue as it collects thereby eliminating the excessive build-up of residue, and yet will inflict minimal damage to the crop.

SUMMARY OF THE INVENTION

The present invention provides an attachment for an auger paddle which essentially eliminates the excess residue build-up in the combine or harvesting apparatus.

In one form of the invention, an attachment for an auger on a harvesting machine includes a paddle which is adapted to secure to a cylindrical member of the auger between the flighting of the auger and at least one projecting member which extends from the paddle and projects above the flighting of the auger for breaking up crop residue which tends to build up above the auger.

In one aspect, the projecting member is secured to the paddle by at least one fastener, for example a screw, a bolt, or a rivet. Alternatively, the projecting member may be integrally formed with the paddle.

In another aspect, the projecting member includes a free-end, with the free-end including a camming surface for urging the crop residue away from the auger to eliminate blockage of the feeder housing of the harvesting machine.

In other aspects, the projecting member comprises a metal material, a plastic material, or a polymeric material. For example, the projecting member may comprise an ultra high molecular weight polyethylene. Alternately, the projecting member may comprise a high density polyethylene.

In another form of the invention, a harvesting machine having an auger and an attachment member. The attachment member comprises an elongated member and a paddle. The elongated member includes a mounting portion and a free-end. The mounting portion is configured for mounting to the paddle which is mounted on the cylindrical member of the auger. The free-end of the elongated member projects from the paddle above the flighting of the auger for cutting and separating crop residue which tends to collect above the auger.

In one aspect, the free-end includes a curved portion to define a camming surface to urge the crop residue away from the auger to eliminate blockage of the feeder housing of the harvesting machine.

As will be understood from the foregoing, the corn-head attachment of the present invention provides numerous advantages over the prior known attachments used on corn-head augers. The attachment cuts into and rakes the residue build-up that tends to occur on the top of the corn-head auger as the crop is urged into the feeder housing of the harvesting machine. By extending above the flighting of the auger, the free-end of the attachment extends further into the constricted flow path of the crop. Furthermore, since the attachment member may be mounted to existing corn paddles, installation and replacement costs are economical and can be easily back-fit on existing harvesting machines. Alternately, a one piece constructed attachment is disclosed which includes a paddle portion and a projecting member and may be directly mounted to the auger of the harvesting machine.

These and other objects, advantages, purposes, and features of the invention will become more apparent from a study of the following description taken in conjunction with the drawings.

BRIEF DESCRIPTION OF THE DRAWINGS

FIG. 3 is an enlarged exploded view of the attachment and a corn-head paddle;

FIG. 4 is a side elevational view of the attachment mounted to the corn-head paddle;

FIG. 5 is a cross-sectional view taken along line V—V of FIG. 2;

FIG. 6A is an enlarged perspective view of the corn-head attachment of FIGS. 1–5;

FIG. 6B is an enlarged perspective view of a second embodiment of the corn-head attachment;

FIG. 6C is an enlarged perspective view of a third embodiment of the corn-head attachment;

FIG. 6D is an enlarged perspective view of a fourth embodiment of the corn-head attachment; and FIG. 7 is a perspective view of a fifth embodiment of the corn-head attachment.

DETAILED DESCRIPTION OF THE PREFERRED EMBODIMENTS

Figure 1:
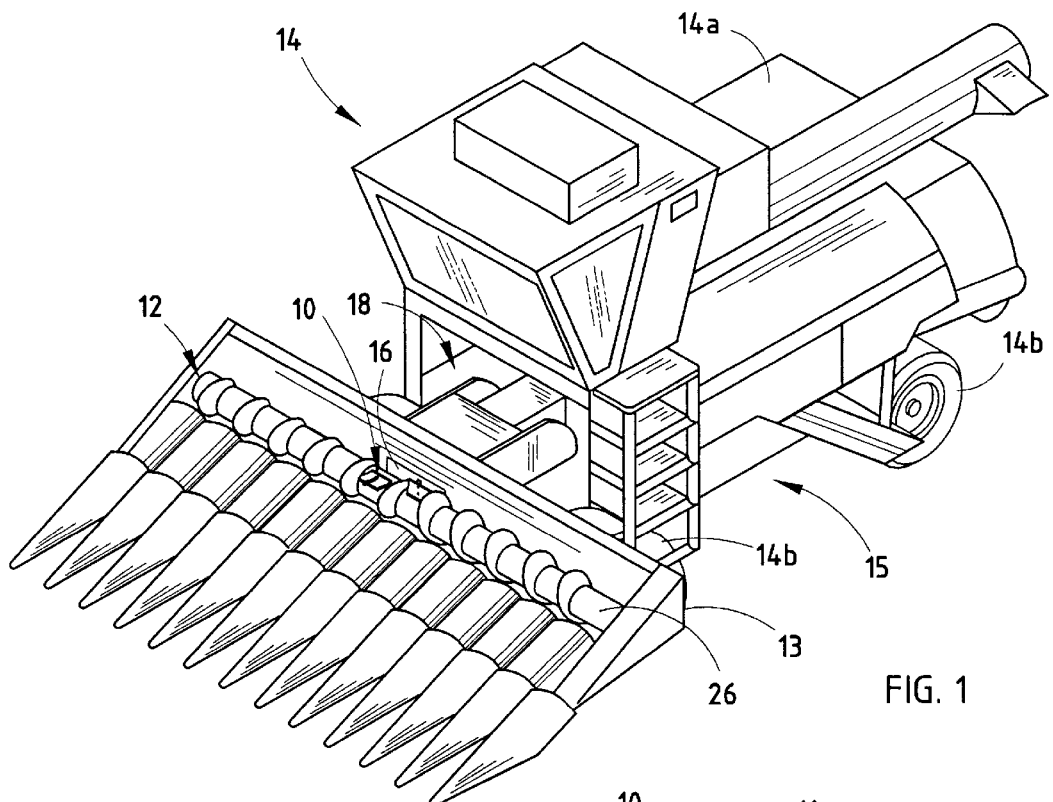
FIG. 1 is an perspective view of the attachment of the present invention mounted on a corn-head auger of a combine.

Referring now to FIG. 1, corn-head attachments 10 of the present invention are shown mounted to a corn-head auger 12 of a corn-head attachment 13 of a combine or harvesting machine 14. Combine 14 includes a body 14a which is supported on a set of wheels 14b, and automotive power means 15 which drives the combine. Corn-head attachment 13 is mounted to a forward end of body 14a and includes an opening 16 which is aligned with a feeder housing 18 of combine 14. Corn-head attachment 13 includes a series of chains 12a with cutting blades 12b for severing crop and moving the severed crop toward auger 12. Auger 12 includes flighting 22 for urging the severed crop toward opening 16. Attachments 10 are positioned on auger 12 to urge the severed crop through opening 16 into feeder housing 18 and to cut into the residue which tends to build-up in the front opening 16 of the feeder housing 18 of combine 14. As a result, attachments 10 essentially eliminate excessive residue build-up normally associated with conventional harvesting machines.

Figure 2:
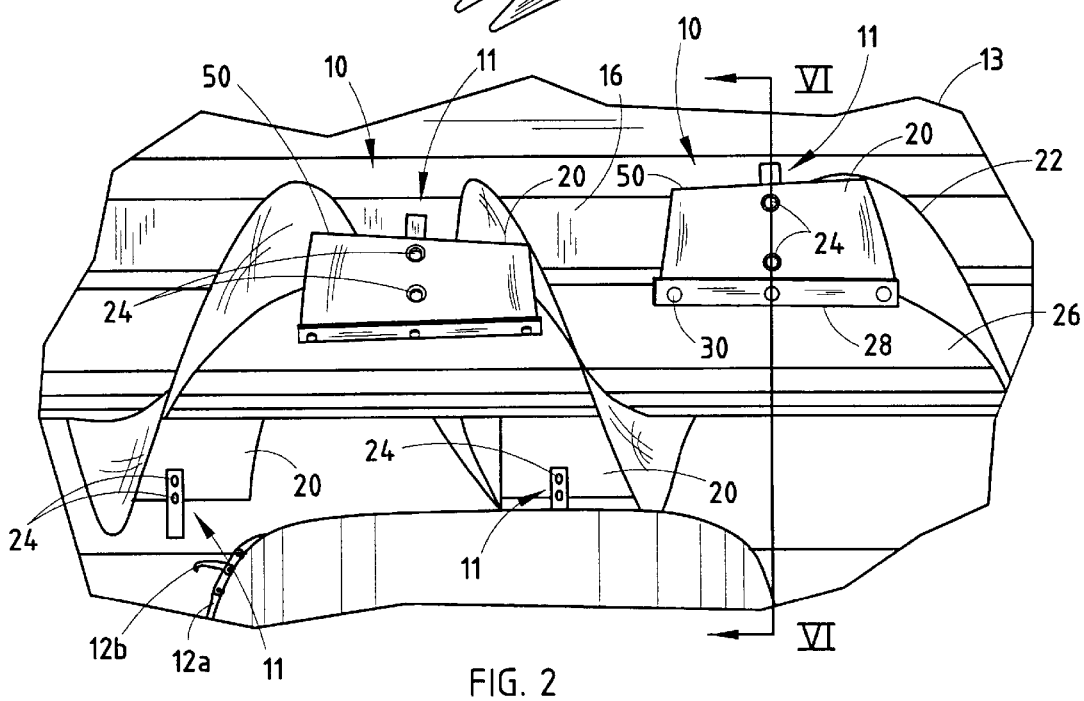
FIG. 2 is an enlarged front view of the corn-head auger with the attachment mounted to the corn-head auger.

As best seen in FIG. 2, each attachment 10 preferably includes at least one attachment member 11 which is mounted to a respective corn paddle 20, which in turn is mounted to auger 12 between the auger flighting 22. Corn paddles 20 may comprise conventional corn paddles. Preferably, corn paddles 20 are formed from a flexible but strong material, such as plastic, rubber, or the like. In addition, each attachment member 11 may comprise a generally rigid material, such as metal. More preferably, each attachment member 11 comprises a strong and impact resistance material, such as a plastic, for example high density polyethylene (HDPE) or ultra high molecular weight polyethylene (UHMW), a rubber, for example a high density rubber, or the like. In the illustrated embodiment attachment member 11 is releasably secured to its respective corn paddle 20 by at least one fastener 24, such as a bolt, screw, or the like. More preferably, each attachment member 11 is secured to its respective corn paddle 20 by at least two fasteners 24 to insure that the respective attachment member 11 does not rotate or pivot on the paddle 20. Alternatively, attachment member may be secured to paddle 20 by a clamp, such as a C-clamp, which is secured or otherwise rigidly fixed to paddle 20. Furthermore, in the case of a plastic attachment member, attachment member 11 may be welded to paddle 20.

Each paddle 20 is mounted to the cylindrical drum 26 of auger 12 by a bracket 28, such as a plate bracket, which is welded or otherwise rigidly secured to drum 26 (FIG. 5). Paddles 20 are preferably releasably secured to brackets 28 by fasteners 30, such as bolts, screws, or the like. Other variations on how the paddles 20 are mounted to drum 26 will be appreciated by those skilled in the art.

In the illustrated embodiment, attachment members 11 are mounted to the respective inner surface 32 of their respective paddle 20, but it should be understood that attachment members 11 may be similarly mounted on the outer surface 34 of their respective paddles.

Referring to FIGS. 3 and 4, each attachment member 11 preferably comprises a generally elongated plate member 36. Elongated plate member 36 includes a mounting portion 38 which is preferably curved or otherwise formed to follow the contours of paddle 20 and includes a pair of spaced apart mounting holes 40 and 42 to receive fasteners 24, which extend through corresponding mounting holes 20a and 20b in paddle 20 and are secured thereto by nuts 25. Elongated plate member 36 further includes a free-end 44 which provides a tooth or slicing portion 46 which projects from paddle 20, as will be more fully described below, to break up the residue which builds up in front of opening 16 of feeder housing 18. Alternatively, attachment member 11 may comprise an elongated tubular member, such as a tube, or rod-shaped member.

Referring to FIG. 6A, free-end 44 of elongated member 36 includes tapered edges 44a and 44b to ease the insertion of the attachment member 19 in between the residue. Furthermore, free-end 44 of attachment member 11 is curved outwardly toward the outer surface 34 of paddle 20 and provides a camming surface to catch the residue on which the residue slides and is directed away from auger 12 to avoid blockage of feeder housing 18. It should be understood that the degree of curvature of free-end 44 may be varied or even may be eliminated so that free-end 44 or tooth portion 46 of attachment 11 is generally planar.

Referring again to FIG. 2, attachment member 11 is mounted to paddle 20 between auger sections or flighting 22. Preferably, attachments 10 are located at least between flighting aligned with opening 16. As best seen in FIG. 5, free-end 44 projects above free-end 50 of paddle 20 and the free-edge 52 of flighting 22. Preferably, attachment member 11 does not contact the trough of the corn-head attachment 13. More preferably, there is a gap in a range of about ¼ inch to one inch between the end of the attachment member and the corn-head attachment trough. In this manner, as corn-head auger 12 rotates, attachment member 11 rakes or cuts into the residue to break up the residue to clean the path into feeder housing 18 for the severed crop. Furthermore, since paddle 20 comprises a generally flexible material and is cantilevered from cylindrical drum 26 of auger 12, paddle 20 deflects and absorbs energy when attachment member 11 encounters a rigid surface thereby reducing the wear on the corn-head attachment 13. Furthermore, the flexible nature of paddles 20 minimize or even eliminate potential damage to the severed crop.

Referring to FIG. 6B, a second embodiment of attachment member 111 is shown. Similar to attachment 11, attachment member 111 comprises an elongated plate member 136. Elongated plate member 136 includes a free-end 144 with tapered sides 144a and 144b, which define a pointed distal end 144c. Attachment member 111 preferably includes a mounting portion 138 with a pair of mounting holes 140 and 142 for receiving fasteners 24 to secured attachment member 111 to paddle 20. Reference is made to attachment member 11 for further details of the material, mounting, and operation.

Referring to FIG. 6C, a third embodiment of attachment member 211 is illustrated. Attachment member 211 comprises an elongated plate member 236 with a mounting portion 238 and a pair of mounting holes 240 and 242 for receiving fasteners 24, which secure attachment member 211 to paddle 20. In this embodiment, free-end 244 of attachment member 210 includes a generally squared-off distal end, which may be more suitable where the stalks of the residue are larger. Again, reference is made to the first embodiment of attachment member 11 for further details of the material, method of mounting to paddle 20, and operation.

A fourth embodiment of attachment member 311 is illustrated in FIG. 6D. Attachment member 311 comprises an elongated plate member 336 with a mounting portion 338 and a free-end 344. Free-end 344 includes a rounded distal end 344c. Again, attachment member 311 includes a pair of mounting holes 340 and 342 for receiving fasteners 24, for securing attachment member 310 to paddle 20. Reference is made herein to attachment member 11 for other details relating to the material, and other methods of mounting.

It should be understood that attachment members 10, 110, 210, and 310 provide illustrative embodiments only and that other configurations, not only of the free-end of the attachment member but also of shape and proportion, may be used.

Referring to FIG. 7, a fifth embodiment of attachment 410 is shown. Attachment 410 includes a paddle portion 420 and a projecting member or finger 411 which extends from a free-edge 420a of paddle 420 to form a tooth or slicing portion 446. In this embodiment, tooth or slicing portion 446 is integrally formed with paddle portion 420. Therefore, finger or slicing member 446 preferably comprises a similar material to paddle 420, such as plastic, rubber, or the like. Alternatively, attachment 410 may be molded from more than one material, with the paddle portion 420 being formed from a generally flexible material and the projecting tooth or slicing member may be formed from a more rigid material to ensure that the tooth portion has sufficient stiffness to cut into and rake the residue build-up. In addition, free-end 444 of attachment member 410 may comprise a squared-off end similar to attachment member 211, a generally flat end with tapered sides similar to attachment member 11, a pointed end similar to attachment member 111, or a rounded end similar to attachment member 311.

While several forms of the invention have been shown and described, other forms will now be apparent to those skilled in the art. The embodiments of the inventions shown in the drawings are not intended to limit the scope of the invention which is defined by the claims which follow.

The embodiments of the invention of which I claim exclusive property or privilege are defined as:

1. An auger on a harvesting machine including an attachment, the auger including a cylindrical member and flighting extending from the cylindrical member and directed toward an opening in a feeder housing for urging crop into the feeder housing in the harvesting machine, said attachment comprising:

a paddle adapted to be secured to the cylindrical member of the auger at the opening between the flighting of the auger; and at least one rigid projecting member fixed to said paddle to mount the projecting member to the cylindrical member of the auger, said projecting member extending from said paddle and being adapted to project above the flighting of the auger for cutting into and breaking up crop residue which tends to build up above the auger.

2. The attachment according to claim 1, wherein said projecting member is secured to said paddle by at least one fastener.

3. The attachment according to claim 2, wherein said fastener comprises one of a screw, a bolt, and a rivet.

4. The attachment according to claim 1, wherein said projecting member is integrally formed with said paddle.

5. The attachment according to claim 1, wherein said projecting member includes a tooth portion, said tooth portion including a camming surface for urging crop residue away from the auger to eliminate blockage of the feeder housing of the harvesting machine.

6. The attachment according to claim 1, wherein said projecting member comprises one of a metal material, a plastic material, and a polymeric material.

7. The attachment according to claim 6, wherein said projecting member comprises an ultra high molecular weight polyethylene.

8. The attachment according to claim 6, wherein said projecting member comprises high density polyethylene.

9. The attachment according to claim 1, wherein said projecting member includes a free-end having a pointed distal end.

10. An auger on a harvesting machine including an attachment, the auger having a cylindrical member and flighting extending around the cylindrical member and directed toward an opening in a feeder housing for urging crop into the feeder housing of the harvesting machine, said attachment comprising:

a first flexible member adapted for being mounted on the cylindrical member of the auger at the opening of the feeder housing between the flighting and for extending transversely between the flighting to urge the crop toward the opening; and a second rigid member being fixed to said first flexible member to mount said rigid member to the cylindrical wall of the auger and projecting from said first flexible member, said second rigid member projecting above the first flexible member and the flighting for cutting into and raking residue build-up in the harvesting machine.

11. The attachment according to claim 10, wherein said second member comprises an elongated plate member having a mounting portion and a free-end portion, said mounting portion being secured to said first member, and said free-end portion projecting above the flighting for cutting into and raking residue build-up in the harvesting machine.

12. An attachment according to claim 11, wherein said free-end portion includes a camming surface for directing the residue away from the auger to eliminate blockage of the feeder housing of the harvesting machine.

13. An attachment according to claim 11, wherein said mounting portion is secured to said first member by at least one fastener.

14. An attachment according to claim 13, wherein said fastener comprises one of a screw, a bolt, and a rivet.

15. An attachment according to claim 11, wherein said first member comprises a corn paddle.

16. An attachment according to claim 10, wherein said first flexible member comprises a generally rectangular paddle having a longitudinal extent oriented along a longitudinal axis of the cylindrical member and having a vertical extent projecting outwardly from the cylindrical member, said rectangular paddle including a free-edge, said second rigid member extending outwardly from said free-edge of said first member.

17. An attachment according to claim 16, wherein said first member includes a central portion, said second member extending from said central portion of said first member.

18. An attachment according to claim 11, wherein said free-end portion includes a pointed distal end.

19. The attachment according to claim 10, wherein said first member and said second member are integrally molded from a polymeric material to form a unitary piece.

20. In a harvesting machine including an auger having a flighting and a feeder housing, said feeder housing having an opening, an attachment comprising:

at least one rectangular paddle mounted to said auger at the opening between said flighting, said paddle having a vertical extent projecting from said auger;

an elongated member having a mounting portion and a free-end, said free-end projecting above said paddle and said flighting of said auger for cutting and separating crop residue which tends to collect above the auger; and means for securing said mounting portion of said elongated member to said paddle and thereby mounting said elongated member to said cylindrical member of said auger.

21. The attachment according to claim 20, wherein said free-end includes a curved portion, said curved portion defining a camming surface.

22. The attachment according to claim 20, wherein said free-end includes a pointed distal end.

23. The attachment according to claim 20, wherein said elongate member comprises an elongated plate member.

24. The attachment according to claim 20, wherein said means includes one of a bolt, a screw, a rivet, and a weld.

* * * * *